| United States Patent [19] | [11] | 4,351,914 |
|---|---|---|
| Khanna | [45] | Sep. 28, 1982 |

[54] CORROSION-RESISTANT, IMPROVED POWDER PRIMER SURFACER

[75] Inventor: Ram-Tirth Khanna, Wilmington, Del.

[73] Assignee: E. I. Du Pont de Nemours and Company, Wilmington, Del.

[21] Appl. No.: 247,135

[22] Filed: Mar. 24, 1981

[51] Int. Cl.$^3$ .............................................. C08L 63/02
[52] U.S. Cl. .................................. 523/448; 523/455; 523/459; 523/461
[58] Field of Search ................ 260/37 EP; 106/14.41, 106/14.44

[56] References Cited

U.S. PATENT DOCUMENTS

| 3,998,771 | 12/1976 | Feneis et al. | 260/37 EP |
|---|---|---|---|
| 4,122,060 | 10/1978 | Yallourakis | 260/37 EP |
| 4,145,370 | 3/1979 | Sreeves | 260/37 EP |
| 4,158,727 | 6/1979 | Matsuda | 528/92 |
| 4,211,565 | 7/1980 | Kresse | 106/14.05 |
| 4,251,426 | 2/1981 | Victorius | 260/37 |

FOREIGN PATENT DOCUMENTS 55-38842  3/1980  Japan ............................. 106/14.41

OTHER PUBLICATIONS

NL Industries, Inc. product description of Nalzin® SC-1 corrosion inhibitive pigment.

*Primary Examiner*—Lewis T. Jacobs

[57] ABSTRACT

Powder primer compositions of the kind consisting essentially of a blend of an epoxy functional film-forming resin with a curing agent, exhibit improved corrosion resistance under powder topcoating compositions when zinc oxide and a dicarboxylic acid are added.

14 Claims, No Drawings

CORROSION-RESISTANT, IMPROVED POWDER PRIMER SURFACER

BACKGROUND OF THE INVENTION

1. Field of the Invention

This invention is related to an improved powder coating composition and, in particular, to an automotive powder primer surfacer exhibiting substantially improved corrosion resistance under a powder topcoat.

2. Description of the Prior Art

Primers are widely used in preparation for the topcoating of metal or steel substrates to form a smooth surface over which the topcoat is applied. Powder primers, which contain no solvent, have gained in popularity since they are compatible with the current environmental emphasis on solvent reductions. For a description of a representative epoxy-resin powder primer composition, see U.S. Pat. No. 4,251,426, issued Feb. 17, 1981, to McClure and Victorius.

However, in utilizing both a powder primer and a powder topcoat, problems with corrosion resistance have been encountered which are not encountered when using topcoat coating compositions involving traditional lacquers and enamels, or even aqueous and high solids technologies. The present invention provides for a powder primer which exhibits unexpectedly improved corrosion resistance when utilized under a powder topcoat.

SUMMARY OF THE INVENTION

There is provided by the present invention an improved corrosion-resistant powder coating composition of the kind consisting essentially of finely divided powder particles of a blend of epoxy functional film-forming resin, an approximately stoichiometric amount of a curing agent that is polyhydroxyl functional, polycarboxyl functional, or polyamino functional, and optionally, a flow control agent, pigment, and filler particles, wherein the improvement comprises:

(A) 12-45% by weight, based on the weight of the film-forming resin, of a compound selected from the group consisting of zinc oxide, a zinc oxide-containing complex, and mixtures of these; and (B) a dicarboxylic acid in an amount by weight equal to 0.5-10% of the total weight of (A), this amount being independent of the amount of any dicarboxylic acid which may be present as the curing agent.

DESCRIPTION OF THE INVENTION

The coating composition of this invention is in the form of finely-divided powder particles at least 95% by weight of which do not exceed 25 microns in maximum dimension and preferably do not exceed 15 microns. In one particularly preferred formulation, the particles all have been passed through a standard 325-mesh screen.

Exclusive of pigments and other nonreactive components, the film-forming components of a preferred coating composition to which the improvements of the present invention apply are comprised of epoxy resins with a polyhydroxyl, polycarboxyl, or polyamino functional curing agent. In addition, there is present a zinc oxide or zinc oxide-containing complex in combination with a dicarboxylic acid.

When used in conjunction with the phenol-modified epoxy resin described below, about 15-30 parts by weight, and preferably 20-25 parts by weight, of such a preferred powder coating composition are an epoxy resin which is of the epichlorohydrin-bisphenol-A kind, of the formula

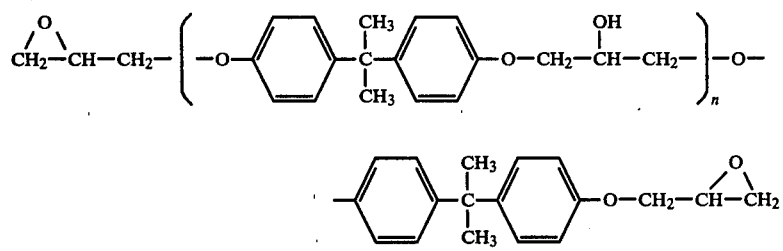

where $n$ is sufficiently large to provide a Gardner-Holdt viscosity of H-S and an epoxide equivalent weight of 400-850. As used herein, the epoxide equivalent weight is the weight in grams of epoxy resin that contains one gram equivalent of epoxide, and the Gardner-Holdt viscosity is measured at 40% polymer solids in diethylene glycol mono-butyl ether at 25° C. If the phenol-modified epoxy resin is not used, the coating composition contains about 22-50 parts by weight, and preferably 32-43 parts by weight of the epichlorohydrin-bisphenol-A resin.

Optionally constituting 7-20 parts by weight, preferably 12-18 parts by weight, of the aforementioned preferred coating composition is a phenol-modified epoxy resin, having an epoxide equivalent weight of 550-675, which is an epoxy resin of the epichlorohydrin-bisphenol-A kind which has been further reacted with phenol and bisphenol-A.

In the production of phenol-modified epoxy resins, by varying the epoxide equivalent weight of the initial epichlorohydrin-bisphenol-A epoxy resin and the weight ratios of the reactants, the viscosity, epoxide equivalent weight, and reactivity of the resultant resin can be varied. A preferred phenol-modified epoxy resin has an epoxide equivalent weight of 550-675 and a viscosity (ASTM-D445) of 3500-7000 centistokes at 120° C.

One such preferred resin is prepared by reacting an epichlorohydrin-bisphenol-A epoxy resin, having an epoxide equivalent weight of 180-192, with bisphenol-A and phenol in an epoxy-resin/bisphenol-A/phenol equivalent-weight ratio of 1.82/1.0/0.5 to provide a phenol-modified epoxy resin having an epoxide equivalent weight of 590-630.

In addition to the epoxy resins described above, another component of the preferred coating composition is a curing agent that is polyhydroxyl, polycarboxyl, or polyamino functional. About 5-15 parts by weight of the curing agent are used in the composition. A preferred curing agent of the polyhydroxyl type is a resin consisting essentially of 1. a mixture of compounds of the general formula

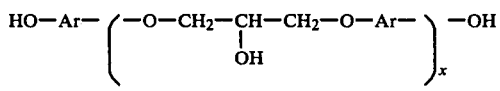

where Ar =

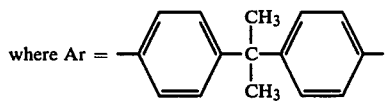

and X is 0 or a positive number, providing a mixture of compounds having an equivalent weight of 230–1000; and 2. 0.1–5.0% by weight, based on the weight of 1, of an accelerator which is a mono- or di-alkyl imidazole, a dialkyl amino methyl phenol, or mixtures of these.

Preferred imidazoles for use in this preferred curing agent are those in which the alkyl groups have 1–4 carbon atoms. Most preferred are methyl and ethyl imidazole. Also preferred for use in the curing agent are dimethyl amino methyl phenol and tris-dimethyl amino methyl phenol.

Whereas the above-described epoxy resin powder coating composition is quite useful as a primer, the present invention provides an improvement in corrosion-resistance of such epoxy resin powder primers, and this improvement consists essentially of adding 12–45% by weight, based on the weight of the film-forming epoxy resin, of zinc oxide, a zinc oxide-containing complex, or mixtures of these, in combination with an amount of dicarboxylic acid equivalent to 0.5–10% of the weight of the aforementioned zinc compounds. This amount of acid is independent of any dicarboxylic acid present in stoichiometric quantities as a curing agent for the epoxy resins.

An example of a zinc oxide-containing complex suitable for use in the invention is a zinc phosphooxide complex marketed by National Lead as "Nalzin SC-1".

Although any dicarboxylic acid can be used in the improvement, a preferred acid is dodecanedioic acid. For purposes of the invention, the acid is micronized, i.e., the particle size is 5 microns or less.

Although it is not known what the exact mechanism is by which the zinc oxide (or modified zinc oxide) and acid combine to inhibit corrosion, it is hypothesized that providing zinc ions in "slowly" leachable form from a water insoluble organic polymer acid ionomer creates a corrosion-inhibiting environment around steel.

In addition to the essential components described previously, a composition to which the present invention applies may also include flow control agents, filler particles, and pigments. Flow control agents, for example, may be present in an amount ranging from 0.1–5.0% by weight, based on the weight of the film-forming components. In general, the flow control agent should be a polymer having a number-average molecular weight of about 1000–20,000. Typically useful flow control agents are polyalkyl acrylates and methacrylates (a suitable example of which is Modaflow ®, available from Monsanto Company), and fluorinated polymers such as esters of polyethylene glycol or polypropylene glycol (a suitable example of which is "Fluorad", available from 3M Company). Ethyl cellulose or silicones such as dimethyl polysiloxane or methyl phenyl polysiloxanes can also be used.

A particularly preferred embodiment of a coating composition to which the present invention applies, utilizes, instead of one of the aforementioned flow control agents, a dispersant of the general formula

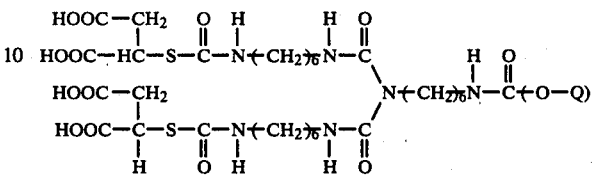

where Q is an acrylic copolymer with mercaptyl succinic acid termination. Such a dispersant provides a number of advantages, including service as a flow control agent, a pigment dispersant, a wetting modifier for the topcoat, and as a surface modifier which protects the surface during baking at high temperatures in gas-fired ovens.

Filler particles may be added to improve sanding properties of the coating. These particles can be present in an amount equivalent to 0.01–60% of the weight of the film-forming constituents. Conventional fillers include talc, silica, barium sulfate, calcium carbonate, aluminum silicate, mica, and the like. Preferably, the filler particles have a maximum size of 20 microns.

Pigment can be added to the invention in an amount equivalent to up to 150% of the weight of the film-forming constituents. Any conventional organic or inorganic pigments are suitable, such as carbon black, titanium dioxide and other metallic oxides, metallic powder, and metal hydroxides.

Also, the invention may contain about 0.3–2.5% by weight, based on the weight of the film-forming constituents, of a tertiary amine of the general formula

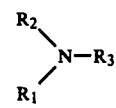

wherein $R_1$, $R_2$, and $R_3$ are the same or different alkyl or hydroxyalkyl radicals having 1–6 carbon atoms. The presence of the tertiary amine is especially useful to make the coating resistant to chemical attack by flue gas in instances when the coating is cured in a gas-fired oven.

One method for forming an improved powder coating composition of the present invention is to blend the components together and then to pass the mixture through a conventional melt-extruder. The extrudate is cooled and can then be reduced to a powder using conventional grinding equipment. After grinding, the powder is passed through a standard mesh screen to remove large particles. Preferably, a sieve that eliminates particles having maximum particle size greater than 15 microns is used.

The powder primer of this invention can be applied directly to a metal or steel substrate. Application can be by using electrostatic spraying techniques or by using a fluidized bed which can be electrostatic. The preferable method is electrostatic spraying in which, for example, a voltage of 20–100 kilovolts is applied to the spray gun. The composition can be applied either in one pass or in several passes to provide variable thicknesses, after cure, of 20-100 microns, preferably 20-50 microns. The substrate to be coated can, optionally, be heated to any temperature up to 175° C. prior to the application of the powder. Preheating the article provides better powder deposition and allows a more uniform coating.

After the application of the powder, the powder-covered article is heated at 135°-210° C. for 5-45 minutes to fuse and to cure the powder particles into a substantially continuous, uniform film. The quality of the film might be affected by the temperature of the cure and the percentage of the accelerator present in the curing agent, in that curing temperatures in the high end of the indicated range can sometimes reduce the flow properties of the coating when the weight percentage of accelerator in the curing agent exceeds 1.6%.

The powder coating composition of this invention is generally useful as a high quality surface treatment for substrates of various kinds, but is particularly useful as a primer for automotive bodies, to which a powder topcoat is to be applied.

The following examples illustrate the invention. In the examples, the components will be referred to according to the following numbering system:

(1) Epoxy resin having the formula

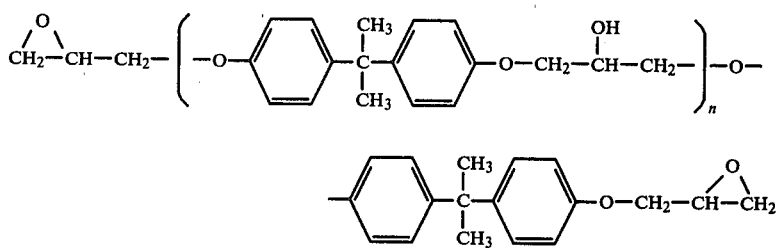

where n is sufficiently large to provide a resin having a Gardner-Holdt viscosity of H-S and an epoxide equivalent weight of 400-850.

(2) Phenol-modified epoxy resin which is an epoxy resin (epoxide equivalent weight 186-192) of the formula of (1) above reacted with bisphenol-A and phenol in an epoxy-resin/bisphenol-A/phenol equivalent weight ratio of 1.82/1.0/0.5 to provide a phenol-modified epoxy resin having an epoxide equivalent weight of 590-630.

(3) Curing agent which is a combination of:
(a) a mixture of compounds of the general formula

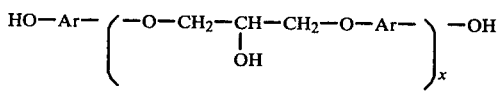

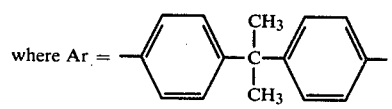

and X is 0 or a positive number, providing a mixture of compounds having an equivalent weight of 230-1000; and
(b) 0.67% by weight, based on the weight of (a), of 2-methylimidazole.

(4) Dispersant of the general formula

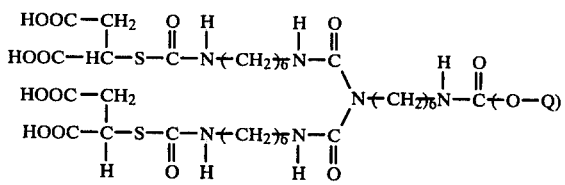

where Q is an acrylic copolymer with mercaptyl succinic acid termination.

EXAMPLE 1

The following components are blended as described:

| Ingredient | % by Weight (Based on Total Weight of all Ingredients) |
|---|---|
| Component 1 | 22.48 |
| Component 2 | 15.23 |
| Zinc oxide | 8.94 |
| Titanium dioxide pigment | 2.37 |
| Carbon black | 0.11 |
| Micronized "Nalzin SC-1" (National Lead) (max. diameter of 5 microns) | 8.91 |
| Micronized Dodecanedioic acid (max. diameter of 5 microns) | 1.18 |
| "Fluorad" (flow control agent) | 0.37 |
| Triethanolamine | 0.59 |
| Component 3 | 10.16 |
| Barium sulfate | 29.67 |

Charge the entire mixture into a Marion mixer and mix for one hour. This blend is then extruded twice in a Cokneader at the highest speed and the lowest possible temperature settings. This is followed by pin milling twice. Afterward, the blend is classified at 600 rpm, to remove coarse particles. Finally, the powder is passed through a 325-mesh kason sieve.

The powder is sprayed as a primer onto 20-gauge panels using Ransburg electrostatic powder guns, and the coated panels are then heated in a gas-fired oven for approximately 45 minutes at 160°-170° C.

EXAMPLE 2

The following components are blended as described:

| Ingredient | % by Weight (Based on Total Weight of All Ingredients) |
|---|---|
| Component 1 | 22.48 |
| Component 2 | 15.23 |
| Zinc oxide | 8.94 |
| Titanium dioxide pigment | 2.37 |
| Carbon black | 0.11 |

| Ingredient | % by Weight (Based on Total Weight of All Ingredients) |
|---|---|
| Micronized Dodecanedioic acid (max. diameter of 5 microns) | 1.18 |
| Component 4 | 0.50 |
| Triethanolamine | 0.59 |
| Component 3 | 10.16 |
| Barium sulfate | 36.98 |

The mixture is then processed in the same fashion as described in Example 1. The resulting powder is then sprayed onto a substrate and cured as in Example 1 also.

What is claimed is:

1. An improved corrosion-resistant powder coating composition of the kind consisting essentially of finely divided powder particles of a blend of an epoxy functional film-forming resin, an approximately stoichiometric amount of a curing agent that is polyhydroxyl functional, polycarboxyl functional, or polyamino functional, and optionally a flow control agent, pigment, and filler particles wherein the improvement comprises:
   (A) 12–45% by weight, based on the weight of the film-forming resin, of a compound selected from the group consisting of zinc oxide, a zinc oxide-containing complex, and mixtures of these; and
   (B) a dicarboxylic acid in an amount by weight equal to 0.5–10% of the total weight of (A), this amount being independent of the amount of any dicarboxylic acid which may be present as the curing agent.

2. The composition of claim 1 wherein the epoxy functional film-forming resin includes a resin of the epichlorohydrin-bisphenol-A kind, having the formula

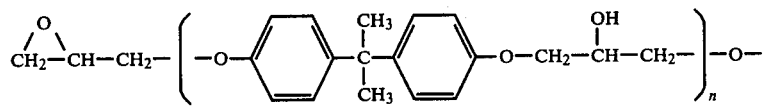

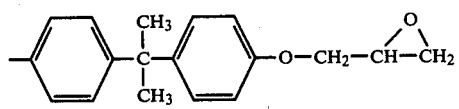

where n is sufficiently large to provide a resin having a Gardner-Hold viscosity of H-S and an epoxide equivalent weight of 400–850.

3. The composition of claim 2 where the curing agent consists essentially of:
   (A) a mixture of compounds of the general formula

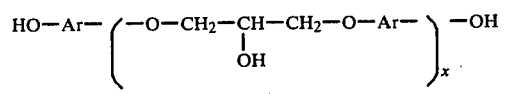

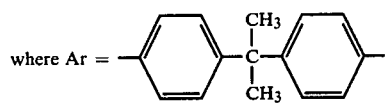

and where x is 0 or a positive number providing a mixture of compounds having an equivalent weight of 230–1000; and
   (B) 0.2–5.0% by weight, based on the weight of (A), of an accelerator which is a mono- or dialkyl imidazole, dialkyl amino methyl phenol, or mixtures of these.

4. The composition of claim 3 wherein the epoxy resin comprises 22–50 parts by weight and the curing agent comprises about 5–15 parts by weight.

5. The composition of claim 2 wherein the epoxy functional film-forming resin also includes a phenol-modified epoxy resin, having an epoxide equivalent weight of 550–675, which is an epoxy resin of the epichlorohydrin-bisphenol-A kind which has been further reacted with phenol and bisphenol-A.

6. The composition of claim 5 wherein the phenol-modified epoxy resin is formed by reacting an epichlorohydrin-bisphenol-A epoxy resin, having an epoxide equivalent weight of 186–192, with bisphenol-A and phenol in an epoxy-resin/bisphenol-A/phenol equivalent-weight ratio of 1.82/1.0/0.5 to provide a phenol-modified epoxy resin having an epoxide equivalent weight of 590–630.

7. The composition of claim 5 wherein the epichlorohydrin-bisphenol-A epoxy resin is about 15–30 parts by weight, the phenol-modified epoxy resin is about 7–20 parts by weight, and the curing agent comprises about 5–15 parts by weight.

8. The composition of claim 5 wherein the epichlorohydrin-bisphenol-A epoxy resin is about 20–25 parts by weight, the phenol-modified epoxy resin comprises about 12–18 parts by weight, and the curing agent comprises about 5–15 parts by weight.

9. The composition of claim 7, 8, or 9 wherein the curing agent consists essentially of:
   (A) a mixture of compounds of the general formula

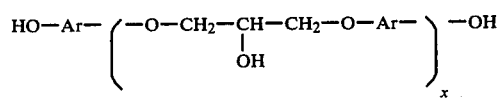

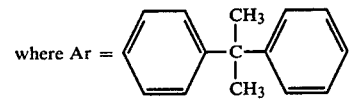

and where x is 0 or a positive number providing a mixture of compounds having an equivalent weight of 230–1000; and
   (B) 0.2–5.0% by weight, based on the weight of (A), of an accelerator which is a mono- or dialkyl imidazole, dialkyl amino methyl phenol, or mixtures of these.

10. The composition of claim 2, wherein there may also be present:
   (A) 0.1–5.0% by weight, based on the weight of the epoxy resins and curing agent, of a flow control agent selected from the group consisting of polyalkyl acrylates, polyalkyl methacrylates, fluorinated esters of polyethylene glycol, fluorinated esters of polypropylene glycol, ethyl cellulose, silicones, a dispersant of the general formula

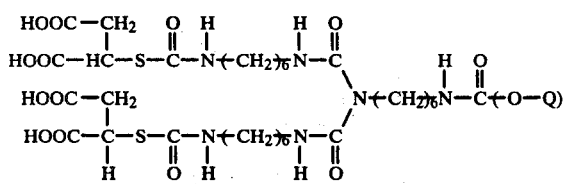

where Q is an acrylic copolymer with mercaptyl succinic acid termination, and mixtures of these;
(B) 0.01–60% by weight, based on the weight of the epoxy resin and curing agent, of filler particles;
(C) up to 150% by weight, based on the weight of the epoxy resin and curing agent, of pigment; or
(D) 0.3–2.5% by weight, based on the weight of the epoxy resins and curing agent, of a tertiary amine of the general formula

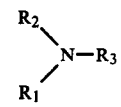

wherein $R_1$, $R_2$, and $R_3$ are the same or different alkyl or hydroalkyl radicals having 1–6 carbon atoms.

11. The composition of claim 9, wherein there may also be present:
(A) 0.1–5.0% by weight, based on the weight of the epoxy resins and curing agent, of a flow control agent selected from the group consisting of polyalkyl acrylates, polyalkyl methacrylates, fluorinated esters of polyethylene glycol, fluorinated esters of polypropylene glycol, ethyl cellulose, silicones, a dispersant of the general formula

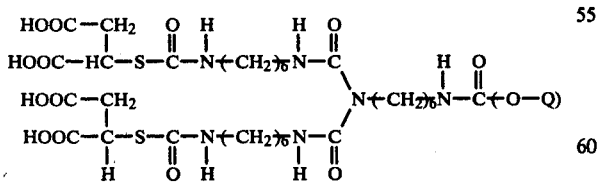

where Q is an acrylic copolymer with mercaptyl succinic acid termination, and mixtures of these;
(B) 0.01–60% by weight, based on the weight of the epoxy resin and curing agent, of filler particles;
(C) up to 150% by weight, based on the weight of the epoxy resin and curing agent, of pigment; or
(D) 0.3–2.5% by weight, based on the weight of the epoxy resins and curing agent, of a tertiary amine of the general formula

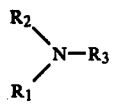

wherein $R_1$, $R_2$, and $R_3$ are the same or different alkyl or hydroalkyl radicals having 1–6 carbon atoms.

12. An improved corrosion-resistant powder coating composition of the kind consisting essentially of finely-divided particles at least 95% by weight of which have a maximum particle size not exceeding 25 microns wherein the particles are a blend of:
(A) 21–23 parts by weight of an epoxy resin of the formula

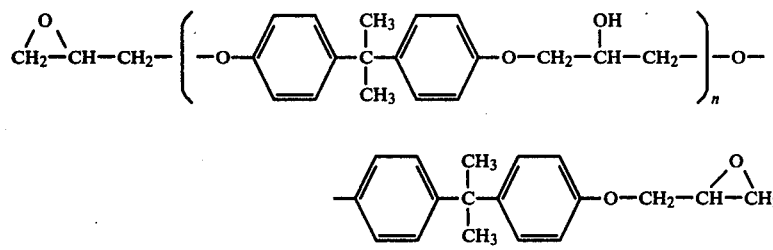

where n is sufficiently large to provide a resin having a Gardner-Holdt viscosity of H–S and an epoxide equivalent weight of 400–850;
(B) 14–16 parts by weight of a phenol-modified epoxy resin which is a resin of the general formula of (A) which has been modified with bisphenol-A and phenol to provide a resin having an epoxide equivalent weight of 590–630;
(C) 9–11 parts by weight of a resinous curing agent consisting essentially of:
(1) a mixture of components of the general formula

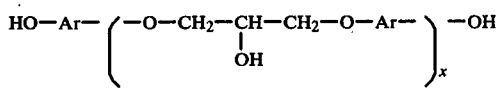

where Ar = 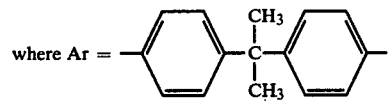

and where x is 0 or a positive number, providing a mixture of compounds with an equivalent weight of 230–1000, and
(2) 0.5–0.7% by weight, based on the weight of (1), of 2-methylimidazole;
(D) 0.2–0.6 parts by weight of a flow control agent selected from the group consisting of fluorinated polyethylene glycol esters, fluorinated propylene glycol esters, a dispersant of the general formula

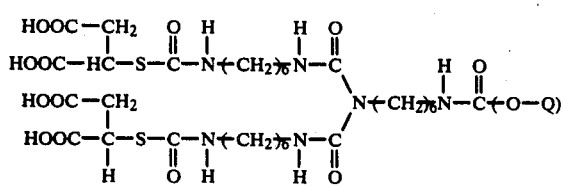

where Q is an acrylic copolymer with mercaptyl succinic acid termination, and mixtures of these;

(E) 0.3-0.7 parts by weight of triethanolamine; wherein the improvement comprises:
(F) 7-10 parts by weight of zinc oxide;
(G) 0.8-1.4 parts by weight of dodecanedioic acid; and
(H) optionally, 7-10 parts by weight of a zinc phospho-oxide complex.

13. The composition of claim 12 additionally containing pigment in an amount up to 150% of the weight of (A), (B) and (C).

14. A substrate coated with the composition of claim 12 or 13.

* * * * *